United States Patent [19]

Masmar et al.

[11] Patent Number: 5,368,618

[45] Date of Patent: * Nov. 29, 1994

[54] METHOD OF MAKING A COATED ABRASIVE ARTICLE

[75] Inventors: Craig A. Masmar, Washington; Douglas S. Spencer, Ramsey; Elizabeth C. Edblom, Hennepin, all of Minn.

[73] Assignee: Minnesota Mining and Manufacturing Company, St. Paul, Minn.

[*] Notice: The portion of the term of this patent subsequent to Oct. 25, 2010 has been disclaimed.

[21] Appl. No.: 970,950

[22] Filed: Nov. 3, 1992

Related U.S. Application Data

[63] Continuation-in-part of Ser. No. 823,861, Jan. 22, 1992, abandoned.

[51] Int. Cl.$^5$ .................................................. B24D 11/00
[52] U.S. Cl. ........................................ 51/295; 51/298
[58] Field of Search ................ 51/293, 295, 298, 307, 51/309

[56] References Cited

U.S. PATENT DOCUMENTS

| | | | |
|---|---|---|---|
| 2,015,658 | 10/1935 | Bezzenberger | 51/278 |
| 2,712,987 | 7/1955 | Storrs et al. | 51/293 |
| 3,887,450 | 6/1975 | Gilano et al. | 204/159.15 |
| 3,895,949 | 7/1975 | Akamatsu et al. | 96/86 P |
| 4,047,903 | 9/1977 | Hesse et al. | 51/298 R |
| 4,318,766 | 3/1982 | Smith | 156/330 |
| 4,478,610 | 10/1984 | Parekh et al. | 51/298 |
| 4,543,106 | 9/1985 | Parekh | 51/298 |
| 4,547,204 | 10/1985 | Caul | 51/298 |
| 4,588,419 | 5/1986 | Caul et al. | 51/295 |
| 4,652,274 | 3/1987 | Boettcher et al. | 51/298 |
| 4,735,632 | 4/1988 | Oxman et al. | 51/295 |
| 4,903,440 | 2/1990 | Larson et al. | 51/298 |
| 4,927,431 | 5/1990 | Buchanan et al. | 51/298 |
| 4,974,373 | 12/1990 | Kawashima et al. | 51/298 |
| 4,997,717 | 3/1991 | Rembold et al. | 478/413 |
| 5,055,113 | 10/1991 | Larson et al. | 51/298 |
| 5,078,753 | 1/1992 | Broberg et al. | 51/307 |
| 5,083,650 | 1/1992 | Seiz et al. | 427/203 |
| 5,256,170 | 10/1993 | Harmer et al. | 51/293 |

FOREIGN PATENT DOCUMENTS

| | | | |
|---|---|---|---|
| 0261098 | 3/1988 | European Pat. Off. | |
| 0284064 | 9/1988 | European Pat. Off. | |
| 321230 | 6/1989 | European Pat. Off. | 51/298 |
| 0429250 | 5/1991 | European Pat. Off. | |
| 53-5490 | 1/1978 | Japan | 51/298 |
| 1588928 | 4/1981 | United Kingdom | |
| 2087263 | 5/1982 | United Kingdom | |
| 87-035393/05 | 2/1987 | U.S.S.R. | |

*Primary Examiner*—Terry J. Owens
*Attorney, Agent, or Firm*—Gary L. Griswold; Walter N. Kirn; David L. Weinstein

[57] ABSTRACT

A method of preparing a coated abrasive article in which the presence of multiple layers of abrasive grains are minimized. In one variation, the method comprises the steps of: (a) providing a backing; (b) applying a make coat precursor to the backing; (c) partially curing the make coat precursor; (d) applying, preferably by projecting, a plurality of abrasive grains into the partially cured make coat precursor; and (e) completely curing the partially cured make coat precursor. In another variation of this method, a size coat precursor is applied over the abrasive grains and cured make coat, and the size coat precursor is completely cured. In another variation of this method, a size coat precursor is applied over the abrasive grains and the partially cured make coat precursor, and the make coat precursor and the size coat precursor are completely cured. The make coat precursor preferably comprises an unsaturated resin that polymerizes via a free radical polymerization mechanism at the site of $\alpha,\beta$-unsaturation.

41 Claims, 2 Drawing Sheets

METHOD OF MAKING A COATED ABRASIVE ARTICLE

This is a continuation-in-part of application Ser. No. 07/823,861 filed Jan. 22, 1992, now abandoned.

BACKGROUND OF THE INVENTION

1. Field of the Invention

This invention relates to a method of preparing a coated abrasive article and, more particularly, a method for preparing a coated abrasive article in which the presence of multiple layers of abrasive grains are minimized.

2. Discussion of the Art

Coated abrasive articles generally comprise a flexible backing having a coating of abrasive grains on one major surface thereof. Coated abrasive articles typically employ a make coat, e.g., a resinous binder, in order to secure the abrasive grains to the backing, and a size coat, e.g., a resinous binder, which is applied over the make coat and abrasive grains in order to firmly bond the abrasive grains to the backing. In certain situations, it is desired to have only one layer of abrasive grains bonded to the backing. Additionally, it is also frequently desired to have the sharp ends of the abrasive grains oriented away from the backing to optimize cut rate.

In the typical manufacturing process for preparing coated abrasive articles, a make coat precursor is first applied to the backing, the abrasive grains are then electrostatically projected into the make coat precursor, and the make coat precursor is partially cured in order to set the abrasive grains. Next, a size coat precursor is applied over the abrasive grains and make coat precursor, and, finally, the make coat precursor and size coat precursor are fully cured. When coating fine abrasive grains, multiple layers of abrasive grains tend to be applied during the electrostatic projecting step. In some instances, up to seven layers of abrasive grains are applied. The presence of multiple layers of abrasive grains becomes a more serious problem as the particle size of the abrasive grains is decreased. If the coating weight of the abrasive grains is reduced, a very blotchy, non-uniform coating of multiple layers of abrasive grains frequently results.

There are many disadvantages associated with multiple layers of abrasive grains in a coated abrasive article. First, many of the abrasive grains tend to be oriented so that their sharp ends do not project away from the backing. Second, abrasive grains tend to lay on top of one another, resulting in reduced abrading performance. Third, multiple layers of abrasive grains often reduce the flexibility of the coated abrasive article. Fourth, multiple layers increase the cost of the coated abrasive article.

U.S. Pat. No. 2,015,658 discloses a method of preparing abrasive articles by applying the make coat precursor by means of metered roll. However, this method does not allow for the abrasive grains to be oriented or electrostatically coated.

SUMMARY OF THE INVENTION

This invention provides a method of preparing a coated abrasive article in which the presence of multiple layers of abrasive grains are minimized. In one variation, the method comprises the steps of:

(a) providing a backing;
(b) applying a make coat precursor to the backing;
(c) partially curing the make coat precursor;
(d) applying, preferably by projecting, a plurality of abrasive grains into the partially cured make coat precursor; and
(e) completely curing the partially cured make coat precursor.

In another variation, the method comprises the steps of:

(a) providing a backing;
(b) applying a make coat precursor to the backing;
(c) partially curing the make coat precursor;
(d) applying, preferably by projecting, a plurality of abrasive grains into the partially cured make coat precursor;
(e) completely curing the partially cured make coat precursor;
(f) applying a size coat precursor over the abrasive grains and cured make coat; and
(g) completely curing the size coat precursor.

In still another variation, the method comprises the steps of:

(a) providing a backing;
(b) applying a make coat precursor to the backing;
(c) partially curing the make coat precursor;
(d) applying, preferably by projecting, a plurality of abrasive grains into the partially cured make coat precursor;
(e) applying a size coat precursor over the abrasive grains and the partially cured make coat precursor; and
(f) completely curing the make coat precursor and the size coat precursor.

The make coat precursor preferably comprises either an unsaturated resin that polymerizes via a free radical polymerization mechanism at the site of $\alpha,\beta$-unsaturation or a radiation curable resin. The ethylenically unsaturated resins are preferably $\alpha,\beta$-unsaturated carbonyl resins and include acrylate resins, methacrylate resins, acrylamide resins, and methacrylamide resins. Free radical polymerization is initiated by a source of free radicals. The source of free radicals can be generated by electron beam radiation or by an appropriate curing agent or initiator. If a curing agent or initiator is employed, the source of free radicals can be generated by exposing the curing agent or initiator to heat or to a source of radiation energy. Examples of sources of radiation energy include electron beam, ultraviolet light, and visible light.

The make coat precursor can optionally contain other resinous adhesive materials or other materials that are polymerizable by other than a free radical mechanism, e.g., a condensation curable resin.

The size coat precursor can comprise any glutinous or resinous adhesive. Examples of such resinous adhesives include phenolic resins, acrylate resins, aminoplast resins, epoxy resins, urethane resins, polyester resins, urea-formaldehyde resins, and combinations thereof.

The make coat precursor or the size coat precursor or both can contain optional additives such as fillers, grinding aids, dyes, pigments, coupling agents, surfactants, lubricants, plasticizers, etc., and mixtures thereof.

During the manufacture of the coated abrasive article, the make coat precursor and the size coat precursor are preferably applied in liquid or semi-liquid state.

DETAILED DESCRIPTION

As used herein, the term "make coat precursor" means the resinous material applied over the front surface of the backing in order to secure the abrasive grains to the backing; the term "radiation curable resin" means any material containing a resin or adhesive, which material is formulated in such a manner that it can be partially cured or fully cured by exposure to radiation; the term "size coat precursor" means the resinous material that is applied over the abrasive grains and make coat or make coat precursor to further secure the abrasive grains to the backing; the term "partially cured" means a condition of a curable resin in which the resin has begun to polymerize and has experienced an increase in molecular weight, but in which the resin continues to be at least partially soluble in an appropriate solvent. The term "fully cured" means a condition of a curable resin in which the resin is polymerized and is in a solid state, and in which the resin is not soluble in a solvent. "Partial curing" can be expressed quantitatively as a function of line speed and distance of resin from source of energy.

Figure 1:
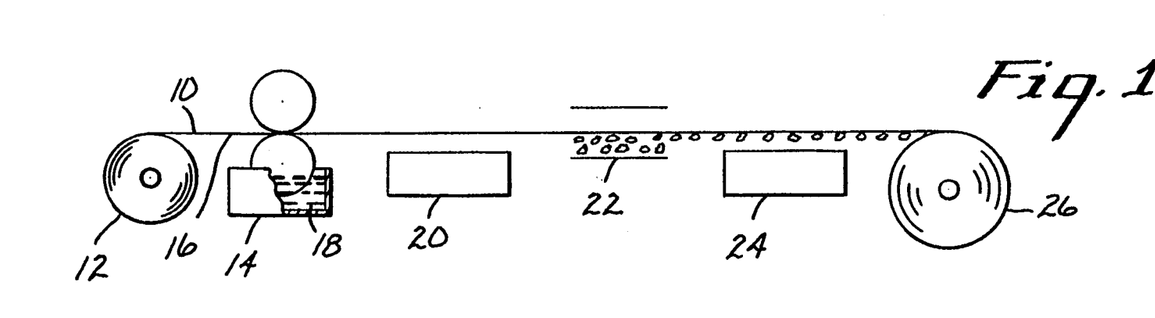
FIG. 1 is a schematic view of the method of making one embodiment of this invention.

Referring to FIG. 1, the coated abrasive article of this invention can be made according to the following procedure. A backing 10 leaves an unwind station 12 and then proceeds through a first coating station 14. At first coating station 14, the front side 16 of backing 10 is coated with a make coat precursor 18. Next, make coat precursor 18 is exposed to a first energy source 20 to partially cure make coat precursor 18. Abrasive grains 22 are applied to partially cured make coat precursor 18. Then, the partially cured make coat precursor is fully cured by means of a second energy source 24. The coated abrasive article prepared thereby can be wound onto a jumbo roll 26.

The material for backing 10 can be any material that can be used to make backings for coated abrasive articles. Examples of typical materials for backings include, but are not limited to, nonwoven substrates, polymeric film, paper, cloth, vulcanized fiber, and treated versions of the foregoing and combinations of the foregoing.

First coating station 14 can employ any type of coating technique that will apply make coat precursor 18 to backing 10. Typical examples of coating techniques that can be used at first coating station include, but are not limited to, roll coating, die coating, spray coating, and curtain coating, with the preferred coating technique being roll coating.

In one embodiment of this invention, the make coat precursor preferably comprises an ethylenically unsaturated resin, which can be any resinous material that can be partially cured by a free radical polymerization mechanism. The ethylenically unsaturated resin polymerizes via a free radical polymerization mechanism at the site of unsaturation. Ethylenically unsaturated resins suitable for this invention include acrylate resins, methacrylate resins, acrylamide resins, and methacrylamide resins. Free radical polymerization is initiated by a source of free radicals, which can be generated by electron beam radiation or by an appropriate curing agent or initiator. If a curing agent or initiator is employed, then a source of free radicals can be generated by exposing the curing agent or initiator to either heat or a source of radiation. Examples of sources of radiation include electron beam, ultraviolet light, and visible light.

Typically, resins curable by a free radical mechanism are preferably selected from the group consisting of acrylated urethane resins, acrylated epoxy resins, ethylenically unsaturated compounds, aminoplast derivatives having pendant unsaturated carbonyl groups, isocyanurate derivatives having at least one pendant acrylate group, isocyanate derivatives having at least one pendant acrylate group, and mixtures and combinations thereof. It is preferred that the resins curable by a free radical mechanism have $\alpha,\beta$-unsaturated carbonyl groups.

Acrylated urethane resins are diacrylate esters of hydroxy terminated NCO extended polyesters or polyethers. Examples of commercially available acrylated urethanes include "UVITHANE 782", available from Morton Thiokol Chemical, and "EBECRYL 6600", "EBECRYL 8400", and "EBECRYL 8805", available from Radcure Specialties.

Acrylated epoxy resins are diacrylate esters of epoxy resins, such as the diacrylate esters of bisphenol A epoxy resin. Examples of commercially available acrylated epoxies include "EBECRYL 3500", "EBECRYL 3600", and "EBECRYL 3700", available from Radcure Specialties.

Ethylenically unsaturated compounds include monomeric and polymeric compounds that contain atoms of carbon, hydrogen, and oxygen, and, optionally, nitrogen and the halogens. Oxygen or nitrogen atoms or both are generally present in ether, ester, urethane, amide, and urea groups. Ethylenically unsaturated compounds preferably have a molecular weight of less than about 4,000 and are preferably esters made from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like. Representative examples of ethylenically unsaturated compounds preferred for this invention include methyl methacrylate, ethyl methacrylate, styrene, divinylbenzene, vinyl toluene, vinyl ether, ethylene glycol diacrylate, ethylene glycol methacrylate, hexanediol diacrylate, triethylene glycol diacrylate, triethylene glycol methacrylate, trimethylolpropane triacrylate, glycerol triacrylate, pentaerythritol triacrylate, pentaerythritol methacrylate, pentaerythritol tetraacrylate, dipentaerythritol pentaacrylate, sorbitol triacrylate, and sorbitol hexaacrylate. Other examples of ethylenically unsaturated compounds include ethylene glycol diitaconate, 1,4-butanediol diitaconate, propylene glycol dicrotonate, dimethyl maleate, and the like. Other ethylenically unsaturated compounds include monoallyl, polyallyl, and polymethallyl esters and amides of carboxylic acids, such as diallyl phthalate, diallyl adipate, and N,N-diallyladipamide. Still other nitrogen-containing compounds include tris(2-acryloyl-oxyethyl)isocyanurate, 1,3,5-tri(2-methacryloxyethyl)-s-triazine, acrylamide, methylacrylamide, N-methylacrylamide, N,N-dimethylacrylamide, N-vinylpyrrolidone, and N-vinylpiperidone.

The aminoplast derivatives preferred for this invention have at least 1.1 pendant $\alpha,\beta$-unsaturated carbonyl groups per molecule. They are further described in U.S. Pat. No. 4,903,440, incorporated herein by reference.

Isocyanurate derivatives having at least one pendant acrylate group and isocyanate derivatives having at least one acrylate group are described in U.S. Pat. No. 4,652,274, incorporated herein by reference.

In another embodiment of the present invention, the make coat precursor comprises a radiation curable resin, which is any resinous or adhesive material that can be partially cured or cured by exposure to radiation energy, so long as an appropriate curing agent or photo-initiator is present, if necessary or desired. Curing by radiation can involve a free radical mechanism or some other type of mechanism, e.g. cationic. Examples of such radiation curable resins include acrylated urethanes, acrylated epoxies, ethylenically unsaturated compounds, aminoplast derivatives having pendant unsaturated carbonyl groups, isocyanurate derivatives having at least one pendant acrylate group, isocyanate derivatives having at least one pendant acrylate group, and mixtures and combinations thereof. The aforementioned radiation curable resins polymerize via a free radical mechanism, and they have been described previously.

Radiation curable resins also include epoxy resins that cure via a cationic polymerization mechanism in the presence of an appropriate curing agent. These resins are further described in U.S. Pat. No. 4,318,766 incorporated herein by reference.

Make coat precursors useful in the process of this invention can make use of resins curable by a free radical mechanism, radiation curable resins, a mixture of two or more resins curable by a free radical mechanism, a mixture of two or more radiation curable resins, a mixture of at least one resin curable by a free radical mechanism and at least one radiation curable resin, a mixture of at least one radiation curable resin and at least one thermosetting resin, and a mixture of at least one resin curable by a free radical mechanism and at least one thermosetting resin. As used herein, a "thermosetting resin" is a resin that is capable of being rendered hard by heat. The preferred thermosetting resin is a condensation curable resin.

When the make coat precursor comprises a mixture of a resin curable by a free radical mechanism and a thermosetting resin or a mixture of a radiation curable resin and a thermosetting resin, the make coat precursor is partially cured before abrasive grains are applied. Partial curing can involve the following situations:

(1) the resin curable by free radical mechanism is fully cured or completely uncured while the thermosetting resin is partially cured;

(2) the resin curable by free radical mechanism is completely uncured while the thermosetting resin is completely cured;

(3) the resin curable by free radical mechanism is partially cured while the thermosetting resin is fully cured or completely uncured;

(4) the resin curable by free radical mechanism is completely cured while the thermosetting resin is completely uncured;

(5) the resin curable by free radical mechanism is partially cured while the thermosetting resin is partially cured;

(6) the radiation curable resin is fully cured or completely uncured while the thermosetting resin is partially cured;

(7) the radiation curable resin is completely uncured while the thermosetting resin is completely cured;

(8) the radiation curable resin is partially cured while the thermosetting resin is fully cured or completely uncured; and (9) The radiation curable resin is completely cured while the thermosetting resin is completely uncured;

(10) the radiation curable resin is partially cured while the thermosetting resin is partially cured.

If condensation curable resins are employed in the make coat precursor of this invention, they are typically selected from the group consisting of phenolic, urea-formaldehyde, and melamine-formaldehyde resins. Phenolic resins are preferred because of their thermal properties, availability, cost, and ease of handling. There are two types of phenolic resins, resole and novolac. Curing of resole phenolic resins, i.e., phenol-formaldehyde resins, is catalyzed by alkaline catalysts and the ratio of formaldehyde to phenol, based on molar equivalents, is greater than or equal to one to one, typically between 1.5:1.0 to 3.0:1.0. Alkaline catalysts suitable for these resins include sodium hydroxide, barium hydroxide, potassium hydroxide, calcium hydroxide, organic amines, and sodium carbonate. Resole phenolic resins are thermosetting resins, and, when cured, exhibit excellent toughness, dimensional stability, strength, hardness, and heat resistance. Curing of novolac phenolic resins, i.e., phenol-formaldehyde resins, is catalyzed by either acidic or alkaline catalysts, and ratio of formaldehyde to phenol, based on molar equivalents, is less than one to one.

Both the resole phenolic resin and novolac phenolic resin, in the presence of an appropriate curing agent or initiator, can be cured by heat. Examples of commercially available phenolic resins have tradenames such as "VARCUM", available from Occidental Chemical Corporation; "AEROFENE", available from Ashland Chemical Co.; "BAKELITE", available from Union Carbide, and "RESINOX", available from Monsanto Company.

When a resin curable by a free radical mechanism and a condensation curable resin are used in the make coat precursor, the ratio, based on weight, of the former to the latter can range from about 100 parts to 0 parts to from about 10 parts to about 90 parts, preferably from about 50 parts to about 50 parts to from about 25 parts to about 75 parts, more preferably from about 20 parts to about 80 parts.

Epoxy resins can also be added to the make coat precursor along with the free radical curable resin or the radiation curable resin. Epoxy resins useful in the process of this invention have an oxirane ring, i.e., This reaction is not a condensation reaction but an opening of the epoxy ring initiated by an acidic or basic catalyst. Such epoxide resins include monomeric epoxy resins and polymeric epoxy resins. These resins can vary greatly in the nature of their backbones and substituent groups. For example, the backbone may be of any type normally associated with epoxy resins and substituent groups thereon can be any group free of an active hydrogen atom that is reactive with an oxirane ring at room temperature.

In one embodiment, the make coat precursor is exposed to an energy source to partially cure the make coat precursor. Polymerization of the resin curable by a free radical mechanism is initiated by a source of free radicals. The source of free radicals may be supplied by electron beam radiation or an appropriate curing agent or initiator added to the resin curable by a free radical mechanism. When the curing agent or initiator is exposed to the energy source, free radicals are generated; these free radicals initiate polymerization.

In another embodiment, the make coat precursor is exposed to a source of radiation energy to partially cure the make coat precursor. Examples of sources of radiation energy include electron beam, ultraviolet light, and visible light. For an electron beam radiation energy source, a curing agent or initiator in the radiation curable resin may or may not be required. For an ultraviolet light or visible light radiation energy source, a curing agent or initiator is typically, but not always, required in the radiation curable resin to initiate the polymerization of the resin.

Electron beam radiation, also known as ionizing radiation, is preferably used at a dosage of 0.1 to 10 Mrad, more preferably at a dosage of 1 to 10 Mrad.

Curing agents or initiators capable of generating free radicals when exposed to elevated temperatures include peroxides, e.g., benzoyl peroxide, azo compounds, benzophenones, and quinones. The temperature for curing at elevated temperatures should be set in the range of from about 50° C. to about 200° C., preferably from about 50° C. to about 100° C., for from about 0.1 to about 14 hours. The curing temperature is limited by the temperatures that the materials of the backings used in the coated abrasive article can withstand.

Curing agents or initiators capable of generating free radicals when exposed to radiation energy from ultraviolet light include organic peroxides, azo compounds, quinones, benzophenones, nitroso compounds, acryl halides, hydrazones, mercapto compounds, pyrylium compounds, triacrylimidazoles, bisimidazoles, chloroalkyltriazines, benzoin ethers, benzil ketals, thioxanthones, and acetophenone derivatives. Additional references to free radical photoinitiator systems for ethylenically unsaturated compounds can be found in U.S. Pat. No. 3,887,450 (e.g., col. 4) and U.S. Pat. No. 3,895,949 (e.g., col. 7). Ultraviolet radiation, as used herein, means non-particulate radiation having a wavelength within the range of 200 to 450 nanometers, more preferably within the range of 250 to 400 nanometers. In some instances, it is preferred that the initiator be in a liquid state. The initiator can then be easily dissolved in the binder precursor. One family of initiators that exists in a liquid state is based upon hydroxy methyl phenyl propanone. This type of material is commercially available from Ciba-Geigy Corp. under the trade designation "Darocur 1173". This initiator is 2-hydroxy-2-methyl-1-phenyl-propan-1-one. The actual amount of the initiator in the liquid state will depend upon several factors such as the desired rate of cure, chemistry of the binder precursor, exposure time to ultraviolet light, and thickness of the coating.

Curing agents or initiators capable of generating free radicals when exposed to visible light are set forth in U.S. Pat. No. 4,735,632, incorporated herein by reference. Visible light radiation energy, as used herein, means non-particulate radiation having a wavelength within the range of 400 to 800 nanometers, more preferably within the range of 400 to 550 nanometers.

The rate of partial polymerization or partial curing, with any source of radiation energy, varies according to the thickness of the layer of resin as well as the density and nature of the resin.

It is preferred that the make coat precursor be partially cured by exposure to a source of radiation energy. Curing by radiation requires considerably less time and energy than does curing by conventional thermal curing methods. Curing by means of radiation does not significantly increase the time for preparing a coated abrasive product.

Figure 4:
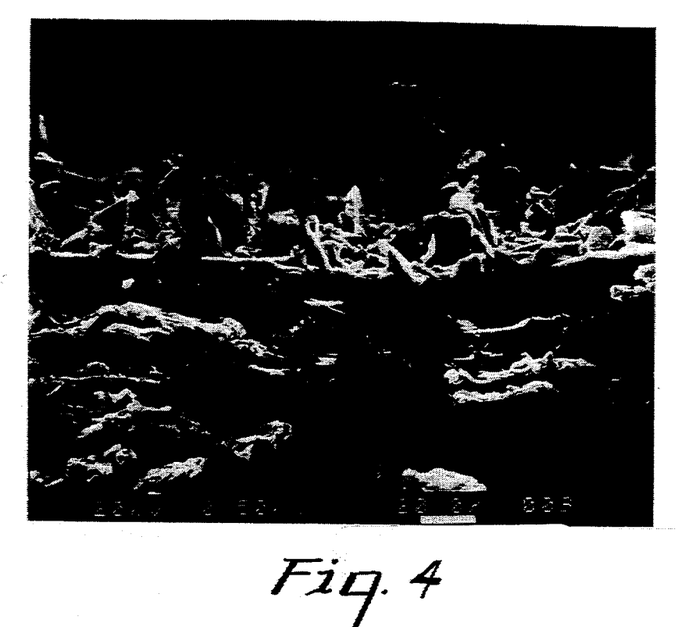
FIG. 4 is a scanning electron photomicrograph of a fractured cross-section of a coated abrasive of the present invention taken at a magnification of 500X. The article did not have a size coat.
Figure 5:
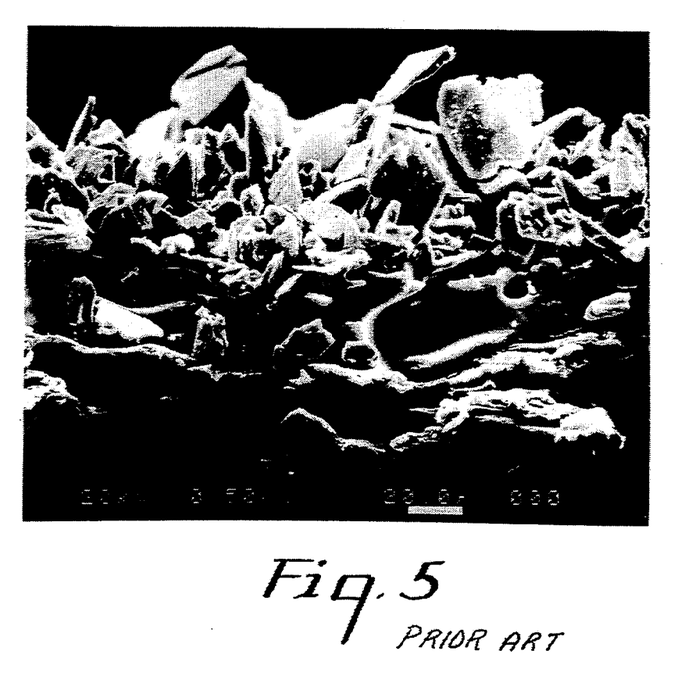
FIG. 5 is a scanning electron photomicrograph of a fractured cross-section of a coated abrasive article of the prior art taken at a magnification of 500X. The article did not have a size coat.

Partial curing, i.e., partial polymerizing, of the make coat precursor minimizes the formation of multiple layers of abrasive grains in the coated abrasive article. FIG. 5 shows a coated abrasive article having multiple layers of abrasive grains. Because most coated abrasive articles employ backings that have a plurality of peaks and valleys, the surface area of the backing is relatively high. The make coat precursor tends to be applied so as to fill up the valleys. The abrasive grains that are applied into the valleys are present at a concentration which tends to lead to multiple layers of abrasive grain in the valleys. If the make coat precursor is partially cured or polymerized before the abrasive grains are applied, the make coat precursor, which fills up the valleys, can solidify to some extent, thereby decreasing the surface area of the backing. This in turn leads to a reduction in multiple layers of abrasive grain in the valleys. Furthermore, when the make coat precursor is partially cured or partially polymerized, the viscosity of the make coat precursor is increased. When the viscosity of the make coat precursor is too low, it wicks up by capillary action around and above the individual abrasive grains such that the abrasive grains are disposed below the surface of the make coat, resulting in an appearance problem, i.e., areas where no abrasive grains appear to be present. To compensate for this problem additional layers of abrasive grains are used. The increase in viscosity of the make coat precursor brought about by the method of this invention generally results in the make coat precursor wetting the abrasive grains less, and, consequently, fewer layers of abrasive grains are needed to cover up areas of the backing in which a lower concentration of abrasive grains may have caused an appearance problem. FIG. 4 shows a coated abrasive article made according to the method of the present invention. The number of layers of abrasive grains in the coated abrasive article of FIG. 4 is lower than the number of layers of abrasive grains in the coated abrasive article of FIG. 5.

The abrasive grains useful in the process of the present invention preferably have a Moh hardness of at least 7, more preferably at least 8. Typical examples of abrasive grains suitable for this invention include aluminum oxide, heat treated aluminum oxide, alumina zirconia, ceramic aluminum oxide, silicon carbide, diamond, cerium oxide, boron carbide, cubic boron nitride, garnet, and mixtures thereof. The abrasive grains can be applied by drop coating or by electrostatic coating. The preferred method of applying the abrasive grains is electrostatic coating.

In one variation, after the abrasive grains are applied, the make coat precursor is fully cured, i.e., or fully polymerized, to form the make coat. The make coat can be fully cured by exposure to thermal energy or radiation energy. If the make coat precursor is fully cured by thermal energy, the temperature of the oven is preferably set at a temperature of from about 50° to 150° C., for from about 30 minutes to about 12 hours. If the make coat precursor is fully cured by radiation, the sources of radiation energy can be the same as those described previously. However, the curing conditions, e.g., dosage, exposure time, for electron beam, ultraviolet light, or visible light, will be typically increased so that the make coat precursor is fully cured. Additionally, it is preferred that full curing of the resins curable by a free radical mechanism take place in an inert atmosphere, such as, for example, nitrogen, because oxygen tends to inhibit free radical polymerization.

Figure 2:
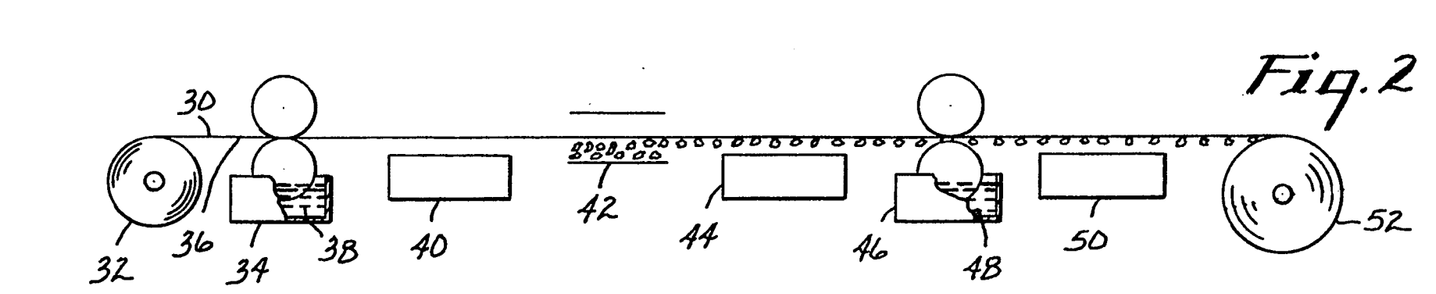
FIG. 2 is a schematic view of the method of making another embodiment of this invention.

Another variation of this invention, similar to the first variation except that a size coat precursor is applied and the size coat precursor is fully cured, is shown in FIG. 2. Referring to FIG. 2, backing 30 leaves an unwind station 32 and goes through a first coating station 34. At first coating station 34, the front side 36 of backing 30 is coated with a make coat precursor 38 containing a radiation curable resin. Next, make coat precursor 38 is exposed to a first energy source 40 to partially cure make coat precursor 38. Next, abrasive grains 42 are applied to the make coat precursor 38. Then, make coat precursor 38 is fully cured by means of a second energy source 44. Following this step, the resulting coated abrasive article proceeds through a second coating station 46 in which a size coat precursor 48 is applied. The size coat precursor 48 is then cured, typically by means of a third energy source 50. Finally, the coated abrasive article is wound onto a jumbo roll 52.

For the second variation, the backing, the first coating station, the make coat precursor, the first energy source, the abrasive grains, and the second energy source can be the same as described for the first variation. The second coating station can be the same as described for the first coating station. The third energy source can be the same as that described for the second energy source described previously.

The size coat precursor can comprise any resinous or glutinous adhesive. Examples of such size coat precursors include phenolic resins, urea-formaldehyde resins, melamine resins, acrylate resins, urethane resins, epoxy resins, polyester resins, aminoplast resins, and combinations of the foregoing and mixtures of the foregoing. The preferred size coat precursor comprises a phenolic resin or an epoxy resin.

The make coat precursor or the size coat precursor or both of any embodiments or variation of this invention can contain optional additives, such as, for example, fillers, fibers, lubricants, grinding aids, wetting agents, surfactants, pigments, dyes, coupling agents, plasticizers, and suspending agents. Preferred fillers include calcium carbonate, calcium oxide, calcium metasilicate, alumina trihydrate, cryolite, magnesia, kaolin, quartz, and glass. Fillers that can function as grinding aids include cryolite, potassium fluoroborate, feldspar, and sulfur. Fillers can be used in amounts up to about 250 parts, preferably from about 30 to about 150 parts, per 100 parts of the make or size coat precursor, while retaining good flexibility and toughness of the cured coat. The amounts of these materials are selected to provide the properties desired.

Organic solvent and/or water may be added to the binder precursor to alter viscosity. Preferred viscosity values range between 10 to 10,000 centipoises, usually between 50 to 1,000 centipoises, at room temperature (25° C.). The selection of the particular organic solvent and/or water depends upon the particular radiation curable resin, free radical curable resin, and/or thermosetting resin utilized in the binder precursor and the amounts of these resins utilized.

Figure 3:
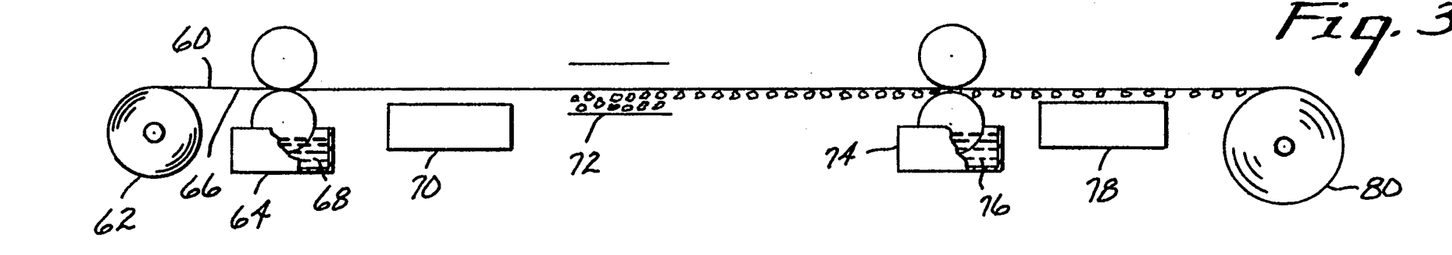
FIG. 3 is a schematic view of the method of making still another embodiment of this invention.

A third variation is similar to the first variation, except that a size coat precursor is applied and the size coat precursor is fully cured. Referring to FIG. 3, backing 60 leaves an unwind station 62 and goes through a first coating station 64. At first coating station 64, the front side 66 of backing 60 is coated with a make coat precursor 68 containing a resin curable by a free radical mechanism. Next, make coat precursor 68 is exposed to a first energy source 70 to partially cure the resin curable by free radical mechanism in the make coat precursor. Next, abrasive grains 72 are applied to the make coat precursor 68. Following this step, the resulting coated abrasive article proceeds through a second coating station 74 in which a size coat precursor 76 is applied. Then, the make coat precursor 68 and size coat precursor 76 are fully cured, typically by means of a second energy source 78. Finally, the coated abrasive article is wound onto a jumbo roll 80.

For the third variation, the backing, the first coating station, the make coat precursor, the first energy source, the abrasive grains, the second coating station, the size precursor, and the second energy source can be the same as those previously described for the first and second variations.

For the second and third variations, it is preferred that the size coat precursor be sprayed onto the surface of the coated abrasive article to minimize destruction of the orientation of the abrasive grains.

The following non-limiting examples will further illustrate the invention. All coating weights are specified in grams/square meter ($g/m^2$). All formulation ratios are based upon weight.

In the following examples, the following abbreviations and formulas are used:

| | |
|---|---|
| BPAS | a composition containing a diglycidyl ether of bisphenol A epoxy resin coatable from an organic solvent. This composition, which had the trademark "EPON 828", was purchased from the Shell Chemical Company, Houston, Texas. |
| $CaCO_3$ | calcium carbonate filler |
| PETA | pentaerythritol triacrylate |
| PA | a polyamide curing agent, having the trade designation "VERSAMID 125", commercially available from Henkel corporation |
| PH1 | 2,2-dimethoxy-1,2-diphenyl-1-ethanone |
| PS | glycol ether solvent |
| PP | polyester resin which is a plasticizer for the resole phenolic resin |
| RP1 | a resole phenolic resin, containing 74% solids and with water and ethylene glycol monoethyl ether as the solvent |
| RP2 | a resole phenolic resin, containing 72% solids and with water as the solvent |
| WA | a glycol ester of a fatty acid as a wetting agent |
| WC100 | an organic solvent, having the trade designation "AROMATIC 100", commercially available from Worum Chemical Co., St. Paul, Minnesota |
| $H_2O$ | water |

The following test procedures were used to test the coated abrasive articles made according to the examples. An ideal coated abrasive article provides a high cut value and a low surface finish value.

Belt Test Procedure

The coated abrasive article for each example was converted into 7.6 cm by 335 cm endless abrasive belts. Two endless coated abrasive belts from each example were tested on a constant load surface grinder. A pre-weighed, steel workpiece, approximately 2.5 cm by 5 cm by 18 cm, was mounted in a holder, positioned vertically, with the 2.5 cm by 18 cm face confronting the endless abrasive belt which was entrained on a serrated rubber contact wheel (36 cm diameter, 60 Shore A durometer) with one on one lands. The workpiece was then reciprocated vertically through a 18 cm path at the rate of 20 cycles per minute, while a spring-loaded plunger forced the workpiece against the belt with a load of 9.1 kg as the belt was driven at about 2,050 meters per minute. After one minute of grinding time had elapsed, the workpiece holder assembly was removed and reweighed, the amount of stock removed calculated by subtracting the weight of the workpiece after abrading from the original weight thereof. Then a new, pre-weighed workpiece and holder were mounted on the equipment. The experimental error on this test was $+/-10\%$. The total cut was the amount of steel removed in 20 minutes.

Disc Test Procedure

The coated abrasive article for each example was converted into a 10.2 cm diameter disc and secured to a foam back-up pad by means of a pressure sensitive adhesive. The coated abrasive disc and back-up pad assembly was installed on a Schiefer testing machine, and the coated abrasive disc was used to abrade a "PLEXIGLASS" polymer workpiece. All of the testing was done underneath a water flood. The endpoint of the test was 500 revolutions or cycles of the coated abrasive disc. The amount of "PLEXIGLASS" polymer removed from the workpiece and the surface finish (Ra) of the "PLEXIGLASS" polymer workpiece were measured at the end of the test. Ra is the arithmetic average of the scratch size in microinches.

Wet Push Pull Test

The coated abrasive article for each example was converted into a 5.6 cm by 22.9 cm rectangular sheet. The abrasive article was secured by means of clips to a 4.5 kg metal back up pad. The dimensions of the coated abrasive surface contacting the workpiece was 5.6 cm by 15.1 cm. The workpiece was a 45 cm by 77 cm metal plate that contained a urethane primer commonly used in the automotive paint industry. During abrading, the surface of the workpiece was flooded with water. The abrasive article/back up pad assembly was moved for 90 strokes against the workpiece to abrade the urethane primer. A stroke was defined as the movement of the operator's hand in a back and forth motion in a straight line. The cut, i.e., the amount in micrometers of primer removed was measured after 90 strokes. The thickness of the primer was measured with an Elcometer measurement tool sold by Elcometer Instruments Limited, Manchester, England. The surface finish Ra, i.e., the surface finish of the primer abraded, was measured after 10 cycles by means of a Surtronic 3 profilometer sold by Rauk Taylor Hobson Limited.

Extent of Partial Cure Tests

The resin used as a make coat for this testing was a blend of (1) the reaction product of two equivalents of hydroxyethyl acrylate reacted with 2,4,4-trimethyl-hexamethylene diisocyanate (60%), (2) triethylene glycol dimethacrylate (30%), (3) isobornyl acrylate (10%) with 1% photoinitiator (PH1) and 1% wetting agent ("SILWET 670", Union Carbide).

The first means for measuring the extent of partial curing involves drawing down a 200 micrometers film of the resin of the make coat precursor on glass microscope slides. The coated and uncoated slides are weighed to determine the amount of resin on each slide. The coated slides are then passed under a 100 W/in. ultraviolet lamp (an RPC ultraviolet processor) at various line speeds. Onto these slides are then drop coated an excess of grade 600 SiC mineral, and the resin is allowed to wet as much mineral as possible. Unbonded mineral remaining is then blown off by air. At faster line speeds, the resin is exposed to less ultraviolet light, resulting in a lower degree of curing of the resin. A relationship between the line speed and the ability of the resin to wet the mineral can be obtained. Lower line speed, i.e., a higher degree of cure, results in lower mineral pickup, and a higher line speed, i.e., a lower degree of cure, results in higher mineral pickup. Representative results of this method are shown below:

| Line speed ft./min.) | Amount of mineral retained/ Amount of resin coated |
| --- | --- |
| No ultraviolet cure | 2.268 |
| 160 | 1.618 |
| 80 | .471 |
| 40 | .328 |
| 20 | .263 |

The extent of curing determines the amount of mineral that the resin of the make coat precursor can wet.

The second means for measuring partial cure follows the foregoing procedure except the mineral is not drop coated onto the cured or partially cured resins. Instead, the resin-coated glass slides are soaked in a solvent (acetone) for one hour. The soaking in acetone removes the soluble or uncured portion of the resin on the slide. A relationship between the radiation dosage provided and the amount of resin dissolved by the acetone can be observed. The slides are then dried in air overnight (approximately 16 hours) at ambient conditions, and are weighed to determine the loss in weight. Higher line speed, i.e., a lower level of cure, results in a more soluble material, leaving less insoluble polymer on the glass slide after drying. Representative results of this method are shown below:

| Line speed (ft./min.) | Amount of insoluble resin (%) |
| --- | --- |
| No cure | 0 |
| 160 | 3.1 |
| 80 | 10.7 |
| 40 | 36.4 |
| 20 | 84.8 |

In both methods, the effects of "partial curing" of the make coat can be observed. Any other factor that affects cure speed, such as formulation of the resin, atmospheric pressure under which the curing step is performed, or distance of the slide from the source of radiation may also have some effect on the extent of cure.

COMPARATIVE EXAMPLE A

A J weight rayon backing containing a phenolic/latex saturant and a phenolic/latex presize coat was prepared. A make coat precursor (75% solids) containing 48% RP1 and 52% $CaCO_3$ was prepared. The make coat precursor was roll coated onto the rayon backing at a wet weight of 75.4 g/m². Next, grade P180 heat-treated aluminum oxide abrasive grains were electrostatically projected into the make coat precursor at a weight of 200 g/m². The resulting article was heated for 90 minutes at a temperature of 88° C. to partially cure the resole phenolic resin. Next, a size coat precursor was prepared by mixing 47.8% RP1, 39.3% $CaCO_3$, 11.6% $H_2O$, and 1.3% PS until homogeneous. Then, the size coat precursor was applied over the abrasive grains at a wet weight of 88 g/m². The resulting article was heated for 90 minutes at a temperature of 88° C. and then for 12 hours at a temperature of 100° C. Afterwards, the coated abrasive article was flexed. The coated abrasive article was tested according to the Belt Test Procedure and the results are set forth in Table 1.

EXAMPLE 1

A make coat precursor consisting of 8% PETA, 42% RP1, 43.5% $CaCO_3$, 0.6% PH1, 2.95% $H_2O$, and 2.95% PS was prepared. The make coat precursor was applied to the same kind of rayon backing that was used in Comparative Example A at a wet weight of 80 g/m². Then, the make coat precursor was exposed at a rate of 13 meters/minute to one ultraviolet lamp having an output of 79 Watts/cm. Grade P180 heat-treated aluminum oxide abrasive grains were then electrostatically projected into the make coat precursor at a weight of 130 g/m². The coated abrasive article was heated for 90 minutes at a temperature of 88° C. to partially cure the resole phenolic resin. A size coat precursor was prepared by mixing 47.8% RP1, 39.3% $CaCO_3$, 11.6% $H_2O$, and 1.3% PS until the mixture was homogeneous. Then, this mixture was applied over the abrasive grains at a wet weight of 75 g/m². The resulting article was heated for 90 minutes at a temperature of 88° C. and then for 12 hours at a temperature of 100° C. Afterwards, the coated abrasive article was flexed. The coated abrasive article was tested according to the Belt Test Procedure and the results are set forth in Table I.

TABLE I

| Example | Total cut (g) | |
|---|---|---|
| | 304 stainless steel | 1018 mild steel |
| Comparative A | 324 | 170 |
| 1 | 272 | 150 |

EXAMPLE 2

A make coat precursor containing 14.2% PETA, 36.4% RP2, 31.2% PP, 2.4% WA, 7.15% PS, 7.15% $H_2O$, and 1.5% PH1 was prepared. The make coat precursor was roll coated onto a waterproof A weight paper at a wet weight of 10.5 g/m². The make coat precursor was exposed at a rate of 23 meters/minute to one ultraviolet lamp having an output of 79 Watts/cm. Then, grade 600 silicon carbide abrasive grains were electrostatically projected into the make coat precursor at an average weight of 16 g/m². The coated abrasive article was heated for 40 minutes at a temperature of 116° C. A size coat precursor was applied over the abrasive grains at a wet weight of 15 g/m². The size coat precursor consisted of 70.71% RP2, 16.5% PP, 2.4% WA, 5.2% PS, and 5.2% $H_2O$. The coated abrasive article was heated for 70 minutes at a temperature of 113° C. The coated abrasive article was then tested according to the Disc Test Procedure and the results are set forth in Table II.

TABLE II

| Example | Cut (g) | Ra (microinches) |
|---|---|---|
| Comparative B | 0.7 | 10.4 |
| 2 | 0.89 | 7.4 |

The product of Comparative Example B was a grade 600 "TRI-M-ITE WETORDRY" Type W paper coated abrasive product, commercially available from Minnesota Mining and Manufacturing Company, St. Paul, Minn. The data in Table II show that the article of Example 2 provided a higher cut value and a lower surface finish value than did the article of Comparative Example B.

EXAMPLE 3

A make coat precursor containing 12.6% PETA, 43.1% RP2, 17.6% PP, 1.5% WA, 12.15% PS, 12.15% $H_2O$, and 0.9% PH1 was prepared. The make coat precursor was roll coated onto a waterproof A weight paper at a wet weight of 10.5 g/m². Then the make coat precursor was exposed at 30.5 meters/minute to one ultraviolet lamp having an output of 79 Watts/cm. Grade 600 silicon carbide abrasive grains were electrostatically projected into the make coat precursor at an average weight of 15 g/m². The coated abrasive article was heated for 40 minutes at a temperature of 116° C. A size coat precursor was applied over the abrasive grains at a wet weight of 15 g/m². The size coat precursor consisted of 62.51% RP2, 5% PP, 2.4% WA, 15.1% PS, and 15% $H_2O$. The coated abrasive article was heated for 70 minutes at a temperature of 113° C. The coated abrasive article was then tested according to the Disc Test Procedure. The results are set forth in Table III.

TABLE III

| Example | Cut (mils) | Ra (microinches) |
|---|---|---|
| Comparative C | 1.04 | 20.5 |
| 3 | 0.93 | 7.4 |

The product of Comparative Example C was a grade 600 "TRI-M-ITE WETORDRY" Type W2 paper coated abrasive, commercially available from Minnesota Mining and Manufacturing Company, St. Paul, Minn. The data in Table III show that the article of Example 3 provided a much lower surface value finish than did the article of Comparative Example C, while providing a slightly lower cut value.

EXAMPLE 4

A make coat precursor containing 13.1% PETA, 61.9% RP2, 5.2% PP, 2.4% WA, 8.2% PS, 8.2% $H_2O$, and 1.0% PH1 was prepared. The make coat precursor was roll coated onto a waterproof A weight paper at a wet weight of 14.7 g/m². Then the make coat precursor was exposed at 30.5 meters/minute to one ultraviolet lamp having an output of 79 Watts/cm. Grade 400 silicon carbide abrasive grains were electrostatically projected into the make coat precursor at an average weight of 16.8 g/m². The coated abrasive article was heated for 40 minutes at a temperature of 116° C. A size coat precursor was applied over the abrasive grains at a wet weight of 16.8 g/m². The size coat precursor consisted of 52.61% RP2, 10% PP, 2.4% WA, 17.5% PS, and 17.5% H₂O. The coated abrasive article was heated for 70 minutes at a temperature of 113° C. The coated abrasive article was then tested according to the Push Pull Test and to the Disc Test Procedure. The Push Pull test results are set forth in Table IV, while the Disc Test results are set forth in Table V.

TABLE IV

| Example | Cut (mils) | Ra (microinches) |
| --- | --- | --- |
| Comparative D | 1.44 | 16.5 |
| 4 | 1.65 | 12.0 |

The product of Comparative Example D was a grade 400 "TRI-M-ITE WETORDRY" Type W paper coated abrasive, commercially available from Minnesota Mining and Manufacturing Company, St. Paul, Minn. The data in Table IV show that the abrasive article of Example 4 provided a higher cut value and a lower surface finish value than did the abrasive article of Comparative Example D.

TABLE V

| Example | Cut (g) | Ra (microinches) |
| --- | --- | --- |
| Comparative D | 7.4 | 28.8 |
| 4 | 6.1 | 27.0 |

The data in Table V show that the abrasive article of Example 4 was comparable to the abrasive article of Comparative Example D with respect to cut value and surface finish value, even though the article of Example 4 had fewer layers of abrasive grains than did the article of Comparative Example D.

EXAMPLE 5

A make coat precursor consisting of 13.6% PETA, 60.5% RP2, 10.9% PP, 2.5% WA, 5.75% PS, 5.75% WT, and 1.0% PH1 was prepared. The make coat precursor was roll coated onto a waterproof A weight paper at a wet weight of 12.6 g/m². Then, the make coat precursor was exposed at a rate 30.5 meters/minute to one ultraviolet lamp having an output of 79 watts/cm. Grade 1000 SiC abrasive grains were then electrostatically projected into the make coat precursor at a weight of 19 g/m². The resulting article was heated for 40 minutes at a temperature of 116° C. A size coat precursor was applied over the abrasive grains at a wet weight of 18 g/m². The size coat precursor consisted of 49.7% BPAS, 25.06% PA, 0.4% wetting agent ("MODA-FLOW", Monsanto Company), and 24.84% WC-100. The resulting abrasive article was heated for 70 minutes at a temperature of 113° C. The coated abrasive article was tested according to the Disc Test Procedure and according to the Push Pull Test Procedure. Disc Test results are set forth in Table VI, while the Push Pull Test results are set forth in Table VII.

TABLE VI

| Example | Cut (g) | Ra (microinches) |
| --- | --- | --- |
| Comparative E | 0.82 | 8 |
| 5 | 0.86 | 8 |

TABLE VII

| Example | Cut (mils) | Ra (microinches) |
| --- | --- | --- |
| Comparative E | 2.1 | 15 |
| 5 | 2.4 | 16 |

Comparative E was a grade 1000 "IMPERIAL WETORDRY" sanding paper (A weight), commercially available from Minnesota Mining and Manufacturing Co., St. Paul, Minn. The data in Table VI and VII show that the abrasive article of Example 5 was comparable to the abrasive article of Comparative Example E with respect to cut value and surface finish value, even though the article of Example 5 had fewer layers of abrasive grains than did the article of Comparative Example E.

EXAMPLE 6 AND 7

The make coat precursor for Example 6 was prepared by thoroughly mixing RP2 (44.4 parts), polyethylene glycol diacrylate (24 parts), polyethylene glycol (15 parts) (PEG 600, commercially available from Union Carbide), wetting agent (0.2 part) ("Silwet L7604", commercially available from Union Carbide), wetting agent (0.2 part) ("Interwet 33", commercially available from Akzo Chemie America), silane coupling agent (1.0 part) ("A1100", commercially available from Union Carbide), water (11.1 parts), PS (3 parts), and initiator (1.1 parts) ("Darocur 1173", commercially available from Ciba-Geigy Corp.).

The make coat precursor for Example 7 was identical to that of Example 6, except the "Darocur 1173" initiator was replaced with PH1 (1.1 parts).

In each of Examples 6 and 7, the make coat precursor was roll coated onto a waterproofed A weight paper at a weight of about 8 g/m². Next, the make coat precursor was exposed to between 90 to 130 Joules of ultraviolet light to partially cure the make coat precursor. Immediately thereafter, grade 2500 JIS silicon carbide abrasive grains were electrostatically coated onto the partially cured make coat precursor at a weight of about 8 g/m². The abrasive grains had been dried prior to electrostatic coating to remove excess water and to prevent the abrasive grains from agglomerating. The resulting construction was thermally cured for 40 minutes at 115° C. Next, a size coat precursor was roll coated over the abrasive grains and make coat precursor at a weight of about 7 g/m². The size coat precursor comprised RP2 (41.5 parts), a plasticizer (7.8 parts) ("Jeffamine EDR148", commercially available from Texaco Inc.), a plasticizer (7.8 parts) ("Jeffamine D230", commercially available from Texaco Inc.), wetting agent (0.2 part) ("Silwet L7604", commercially available from Union Carbide), a wetting agent (0.2 part) ("Interwet 33", commercially available from Akzo Chemie America), silane coupling agent (0.5 part) ("A1100", commercially available from Union Carbide), and water (42 parts). The resulting coated abrasive articles were thermally cured at 115° C. for 70 minutes.

The coated abrasive articles were tested according to Disc Test Procedure. The results are set forth in Table VIII.

TABLE VIII

| Example | Cut (g) | Ra (microinches) |
| --- | --- | --- |
| 6 | 0.43 | 2 |

TABLE VIII-continued

| Example | Cut (g) | Ra (microinches) |
|---------|---------|------------------|
| 7       | 0.40    | 2                |

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of preparing a coated abrasive article comprising the steps of:
   (a) providing a backing;
   (b) applying a make coat precursor to said backing;
   (c) partially curing said make coat precursor;
   (d) applying a plurality of abrasive grains into said partially cured make coat precursor; and
   (e) completely curing said partially cured make coat precursor.

2. The method of claim 1, wherein said make coat precursor comprises a resin selected from the group consisting of unsaturated resins that polymerize via a free radical polymerization mechanism at the site of $\alpha,\beta$-unsaturation, radiation curable resins, and combinations of the foregoing.

3. The method of claim 2, wherein said make coat precursor further comprises a thermosetting resin.

4. The method of claim 3, wherein said thermosetting resin is selected from the group consisting of phenolic resins, acrylate resins, aminoplast resins, epoxy resins, urethane resins, polyester resins, urea-formaldehyde resins, and combinations thereof.

5. The method of claim 2, wherein said unsaturated resin is an $\alpha,\beta$-unsaturated carbonyl resin.

6. The method of claim 2, wherein said unsaturated resin is a member selected from the group consisting of acrylate resins, methacrylate resins, acrylamide resins, and methacrylamide resins.

7. The method of claim 1, wherein curing is initiated by a source of free radicals.

8. The method of claim 1, wherein said make coat precursor includes a member selected from the group consisting of curing agent, initiator, and both curing agent and initiator.

9. The method of claim 1, wherein said make coat precursor further includes an additive selected from the group consisting of fillers, fibers, lubricants, grinding aids, wetting agents, surfactants, pigments, dyes, coupling agents, plasticizers, and suspending agents.

10. The method of claim 1, wherein said make coat precursor comprises a free radically curable resin and a thermosetting resin.

11. The method of claim 1, wherein said make coat precursor comprises a radiation curable resin and a thermosetting resin.

12. The method of claim 1, wherein said make coat precursor comprises an unsaturated resin that polymerizes via a free radical polymerization mechanism at the site of $\alpha,\beta$-unsaturation and a thermosetting resin.

13. The method of claim 8, wherein said initiator is in a liquid state.

14. A method for preparing a coated abrasive article comprising the steps of:
   (a) providing a backing;
   (b) applying a make coat precursor to said backing;
   (c) partially curing said make coat precursor;
   (d) applying a plurality of abrasive grains into said partially cured make coat precursor;
   (e) completely curing said partially cured make coat precursor;
   (f) applying a size coat precursor over said abrasive grains and said cured make coat; and
   (g) completely curing said size coat precursor.

15. The method of claim 14, wherein said make coat precursor comprises a resin selected from the group consisting of unsaturated resins that polymerize via a free radical polymerization mechanism at the site of $\alpha,\beta$-unsaturation, radiation curable resin, and combinations of the foregoing.

16. The method of claim 15, wherein said unsaturated resin is an $\alpha,\beta$-unsaturated carbonyl resin.

17. The method of claim 15, wherein said unsaturated resin is a member selected from the group consisting of acrylate resins, methacrylate resins, acrylamide resins, and methacrylamide resins.

18. The method of claim 14, wherein curing is initiated by a source of free radicals.

19. The method of claim 14, wherein said make coat precursor includes a member selected from the group consisting of curing agent, initiator, and both curing agent and initiator.

20. The method of claim 14, wherein said make coat precursor further includes an additive selected from the group consisting of fillers, fibers, lubricants, grinding aids, wetting agents, surfactants, pigments, dyes, coupling agents, plasticizers, and suspending agents.

21. The method of claim 14, wherein said size coat precursor comprises a glutinous adhesive or a resinous adhesive or both a glutinous adhesive and a resinous adhesive.

22. The method of claim 15, wherein said make coat precursor further comprises a thermosetting resin.

23. The method of claim 22, wherein said thermosetting resin is selected from the group consisting of phenolic resins, acrylate resins, aminoplast resins, epoxy resins, urethane resins, polyester resins, urea-formaldehyde resins, and combinations thereof.

24. The method of claim 14, wherein said make coat precursor comprises a free radically curable resin and a thermosetting resin.

25. The method of claim 14, wherein said make coat precursor comprises a radiation curable resin and a thermosetting resin.

26. The method of claim 14, wherein said make coat precursor comprises an unsaturated resin that polymerizes via a free radical polymerization mechanism at the site of $\alpha,\beta$-unsaturation and a thermosetting resin.

27. The method of claim 19, wherein said initiator is in a liquid state.

28. A method for preparing a coated abrasive article comprising the steps of:
   (a) providing a backing;
   (b) applying a make coat precursor to said backing;
   (c) partially curing said make coat precursor;
   (d) applying a plurality of abrasive grains into said partially cured make coat precursor;
   (e) applying a size coat precursor over said abrasive grains and said partially cured make coat precursor; and
   (f) completely curing said partially cured make coat precursor and said size coat precursor.

29. The method of claim 28, wherein said make coat precursor comprises a resin selected from the group consisting of unsaturated resins that polymerize via a free radical polymerization mechanism at the site of $\alpha,\beta$-unsaturation, radiation curable resin, and combinations of the foregoing.

30. The method of claim 29, wherein said unsaturated resin is an $\alpha,\beta$-unsaturated carbonyl resin.

31. The method of claim 29, wherein said unsaturated resin is a member selected from the group consisting of acrylate resins, methacrylate resins, acrylamide resins, and methacrylamide resins.

32. The method of claim 28, wherein curing is initiated by a source of free radicals.

33. The method of claim 28, wherein said make coat precursor includes a member selected from the group consisting of curing agent, initiator, and both curing agent and initiator.

34. The method of claim 28, wherein said make coat precursor further includes an additive selected from the group consisting of fillers, fibers, lubricants, grinding aids, wetting agents, surfactants, pigments, dyes, coupling agents, plasticizers, and suspending agents.

35. The method of claim 28, wherein said size coat precursor comprises a glutinous adhesive or a resinous adhesive or both a glutinous adhesive and a resinous adhesive.

36. The method of claim 29, wherein said make coat precursor further comprises a thermosetting resin.

37. The method of claim 36, wherein said thermosetting resin is selected from the group consisting of phenolic resins, acrylate resins, aminoplast resins, epoxy resins, urethane resins, polyester resins, urea-formaldehyde resins, and combinations thereof.

38. The method of claim 28, wherein said make coat precursor comprises a free radically curable resin and a thermosetting resin.

39. The method of claim 28, wherein said make coat precursor comprises a radiation curable resin and a thermosetting resin.

40. The method of claim 28, wherein said make coat precursor comprises an unsaturated resin that polymerizes via a free radical polymerization mechanism at the site of $\alpha\beta$-unsaturation and a thermosetting resin.

41. The method of claim 33, wherein said initiator is in a liquid state.

* * * * *